(12) United States Patent
Khandekar et al.

(10) Patent No.: US 7,957,327 B2
(45) Date of Patent: Jun. 7, 2011

(54) EFFICIENT SUPPORT FOR TDD BEAMFORMING VIA CONSTRAINED HOPPING AND ON-DEMAND PILOT

(75) Inventors: Aamod Khandekar, San Diego, CA (US); Arak Sutivong, Bangkok (TH); Ravi Palanki, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1253 days.

(21) Appl. No.: 11/435,572

(22) Filed: May 16, 2006

(65) Prior Publication Data

US 2006/0274679 A1 Dec. 7, 2006

Related U.S. Application Data

(60) Provisional application No. 60/682,548, filed on May 18, 2005, provisional application No. 60/731,026, filed on Oct. 27, 2005.

(51) Int. Cl.
*H04Q 7/36* (2006.01)
(52) U.S. Cl. ........ 370/278; 370/294; 370/279; 455/434; 455/561; 455/443; 455/517; 455/524
(58) Field of Classification Search ........................ None
See application file for complete search history.

(56) References Cited

U.S. PATENT DOCUMENTS

| 6,545,997 | B1 | 4/2003 | Bohnke et al. | |
|---|---|---|---|---|
| 7,016,649 | B1 * | 3/2006 | Narasimhan et al. | ........ 455/63.1 |
| 2001/0055297 | A1 | 12/2001 | Benveniste | |
| 2006/0072604 | A1 * | 4/2006 | Sutivong et al. | ............. 370/437 |

FOREIGN PATENT DOCUMENTS

| CN | 1101470 | 4/1995 |
|---|---|---|
| CN | 1298578 | 6/2001 |
| EP | 1 005 180 | 5/2000 |
| JP | 6104865 | 4/1994 |
| JP | 1127406 | 1/1999 |
| JP | 2003503920 | 1/2003 |
| KR | 1020050037597 | 4/2005 |
| KR | 1020030096405 | 6/2005 |

(Continued)

OTHER PUBLICATIONS

International Search Report—PCT/US2006/019629, International Search Authority—European Patent Office—Oct. 18, 2006.

(Continued)

*Primary Examiner* — Charles N Appiah
*Assistant Examiner* — Randy Peaches
(74) *Attorney, Agent, or Firm* — Milan Patel; Howard H. Seo

(57) ABSTRACT

Systems and methodologies are described that facilitate providing time-division duplexed beam-forming support in traditionally non-time-division duplexed wireless systems, such as an OFDMA system, a WCDMA system, etc. According to an aspect, a base station can analyze pilot information, such as a portion of bandwidth over which a user device is transmitting, and can transmit on the downlink using pre-hopped portion of bandwidth utilized by the user device on the preceding reverse link time slot. The base station can additionally transmit bandwidth segment reassignments to the user device to facilitate bandwidth segment hopping between user devices served by the base station. Additionally, the base station can instruct the user device to provide on-demand pilot information to resolve ambiguity related thereto.

28 Claims, 12 Drawing Sheets

FOREIGN PATENT DOCUMENTS

| | | |
|---|---|---|
| TW | 485719 | 5/2002 |
| TW | 1221361 | 9/2004 |
| TW | 1229985 | 3/2005 |
| WO | WO9512296 | 5/1995 |
| WO | WO9814026 | 4/1998 |
| WO | WO0249306 | 6/2002 |
| WO | WO 03/021993 | 3/2003 |

OTHER PUBLICATIONS

Taiwanese Search Report—TW095117669—Search Authority—TIPO—Jan. 21, 2009.

Written Opinion—PCTIUS2006/019629, International Search Authority—European Patent Office—Oct. 18, 2006.

* cited by examiner

EFFICIENT SUPPORT FOR TDD BEAMFORMING VIA CONSTRAINED HOPPING AND ON-DEMAND PILOT

CLAIM OF PRIORITY UNDER 35 U.S.C. §119

This application claims priority to U.S. Patent Application Ser. No. 60/682,548, filed on May 18, 2005, entitled "METHOD AND APPARATUS FOR TDD DOWNLINK BEAMFORMING VIA CONSTRAINED HOPPING AND ON-DEMAND PILOT" and U.S. Patent Application Ser. No. 60/731,026, filed on Oct. 27, 2005, entitled "METHOD AND APPARATUS FOR TDD DOWNLINK BEAMFORMING VIA CONSTRAINED HOPPING AND ON-DEMAND PILOT", both are assigned to the assignee hereof and hereby expressly incorporated by reference herein.

BACKGROUND

I. Field

The following description relates generally to wireless communications, and more particularly to providing beamforming support using bandwidth segment hopping and on-demand pilot channel retrieval in a TDD wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Conventional wireless systems do not provide support for certain beam-forming techniques due to bandwidth limitations, processing overhead, and the like. Thus, there exists a need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with supporting time-division duplexed beam-forming in a wireless communication environment. According to one aspect, constrained bandwidth segment hopping and/or on-demand pilot information retrieval can be employed to support TDD beam-forming in, for instance, a TDD OFDMA wireless communication system, a TDD WCDMA wireless communication system, etc.

According to a related aspect, a method of improving bandwidth utilization and supporting time-division duplexed beam-forming in a wireless communication environment can comprise evaluating a bandwidth segment utilized by a user device in a received reverse link transmission and transmitting a signal to the user device in a subsequent forward link time slot using the same bandwidth segment. The method can further comprise assigning a new, pre-hopped bandwidth segment to the user device for utilization in a next reverse link time slot, hopping bandwidth segments on a forward link according to a segment hopping pattern utilized in a preceding reverse link, as well as verifying whether the new bandwidth segment is assignable. If the segment is assignable, then the method can comprise scheduling a forward link transmission on the assigned pre-hopped segment, and transmitting the forward link signal. If the segment is not assignable, the method can further comprise transmitting an instruction to the user device assigning a new bandwidth segment to the user device and directing the user device to utilize the new segment for a subsequent reverse link transmission. Additionally and/or alternatively, the method can further comprise transmitting a signal to the user device instructing the user device to provide on-demand pilot information related to a pilot channel utilized by the user device.

According to another aspect, an apparatus that facilitates constrained bandwidth segment hopping in a wireless communication environment can comprise a memory that stores information related to bandwidth segment assignments to user devices in a sector, and a processor, coupled to the memory, that assigns and reassigns bandwidth segments to user devices according to a predefined schedule and hops bandwidth segments on a forward link according to a segment hopping pattern utilized in a preceding reverse link. The processor can generate a signal for forward link transmission over the assigned bandwidth segment. The apparatus can further comprise a reverse link channel assignment component that determines whether a bandwidth segment is assignable and generates an instruction for a user device to switch to a new bandwidth segment when the bandwidth segment is not assignable. The apparatus can still further comprise a pilot request component that provides an instruction for a user device to provide on-demand pilot information when the reverse link channel detector cannot identify the reverse link channel in the received reverse link signal. Moreover, the apparatus can comprise a hop component that generates bandwidth segment hopping instructions that facilitate bandwidth segment reassignment between user devices by the processor.

Yet another aspect relates to a wireless communication apparatus, comprising means for dividing communication bandwidth into a plurality of bandwidth segments, means for assigning bandwidth segments to user devices in a sector, and means for reassigning bandwidth segments to user devices and performing bandwidth segment hopping on a forward link according to a segment hopping pattern utilized in a preceding reverse link. The apparatus can further comprise means for determining whether a bandwidth segment is assignable, means for transmitting a downlink signal over the assigned bandwidth segment, means for providing a bandwidth segment reassignment in the transmitted downlink signal, and means for requesting on-demand pilot channel information from a user device in the transmitted downlink signal.

Another aspect relates to a computer-readable medium having stored thereon computer-executable instructions for ascertaining a bandwidth segment utilized by a user device in a received reverse link transmission, transmitting a signal in a subsequent forward link time slot using the ascertained bandwidth segment, assigning a new pre-hopped bandwidth segment to the user device for utilization in a next reverse link time slot and hopping bandwidth segments on a forward link according to a segment hopping pattern utilized in a preceding reverse link. The instructions can further comprise determining whether the pre-hopped bandwidth segment is assignable at the time of forward link transmission, and transmitting the forward link signal if the pre-hopped bandwidth segment is assignable. The instructions can still further comprise transmitting a new bandwidth segment assignment to the user device and directing the user device to utilize the new segment for a subsequent reverse link transmission if the pre-hopped bandwidth segment is not assignable, as well as transmitting a signal to the user device instructing the user device to provide on-demand pilot information related to a pilot channel utilized by the user device if the pre-hopped bandwidth segment is not assignable.

A further aspect relates to a processor that executes instructions for increasing throughput in a wireless communication environment, the instructions comprising receiving a reverse link signal over a bandwidth segment, transmitting a signal in a subsequent forward link time slot over the same bandwidth segment, assigning a new bandwidth segment to the user device for utilization in a next reverse link time slot, and hopping bandwidth segments on a forward link according to a segment hopping pattern utilized in a preceding reverse link. The instructions can further comprise transmitting the forward link signal if the new bandwidth segment is assignable, transmitting an alternate bandwidth segment assignment to the user device if the new bandwidth segment is not assignable, and/or transmitting a signal to the user device instructing the user device to provide on-demand pilot information related to a pilot channel utilized by the user device if the new bandwidth segment is not assignable.

Yet another aspect relates to a method of improving bandwidth utilization and supporting time-division duplexed beam-forming at a user device in a wireless communication environment, comprising transmitting a signal over a bandwidth segment in a reverse link transmission, receiving a signal in a subsequent forward link time slot using the same bandwidth segment, and receiving an assignment of a new, pre-hopped bandwidth segment for utilization in a next reverse link time slot. The method may further comprise receiving an instruction that assigns a new bandwidth segment at the user device and utilizing the new segment for a subsequent reverse link transmission if the pre-hopped segment is not assignable, and/or receiving a signal at the user device instructing the user device to provide on-demand pilot information related to a pilot channel utilized by the user device if the pre-hopped segment is determined not to be assignable.

Yet another aspect relates to an apparatus that facilitates improving bandwidth utilization and supporting time-division duplexed beam-forming at a user device in a wireless communication environment, comprising a transmitter that transmits a signal over a bandwidth segment in a reverse link transmission, and a receiver that receives a signal to in a subsequent forward link time slot using the same bandwidth segment utilized in the reverse link transmission, wherein the receiver further receives an assignment of a new, pre-hopped bandwidth segment for utilization in a next reverse link time slot, and wherein the transmitter transmits a signal using the pre-hopped bandwidth segment in the next reverse link time slot. The receiver may receive an assignment of a new bandwidth segment and utilizes the new segment for a subsequent reverse link transmission if the pre-hopped segment is not assignable. Additionally or alternatively, the receiver may receive a command to provide on-demand pilot information related to a pilot channel utilized by the user device if the pre-hopped segment is determined not to be assignable.

According to still a further aspect, an apparatus that facilitates improving bandwidth utilization and supporting time-division duplexed beam-forming at a user device in a wireless communication environment may comprise means for transmitting a signal over a bandwidth segment in a reverse link transmission, means for receiving a signal in a subsequent forward link time slot using the same bandwidth segment, and means for receiving an assignment of a new, pre-hopped bandwidth segment for utilization in a next reverse link time slot. The apparatus may additionally comprise means for receiving an instruction that assigns a new bandwidth segment at the user device and utilizing the new segment for a subsequent reverse link transmission if the pre-hopped segment is not assignable, and/or means for receiving a signal at the user device instructing the user device to provide on-demand pilot information related to a pilot channel utilized by the user device if the pre-hopped segment is determined not to be assignable.

Still another aspect relates to a computer-readable medium having computer-executable instructions stored thereon for transmitting a signal over a bandwidth segment in a reverse link transmission, receiving a signal in a subsequent forward link time slot using the same bandwidth segment; and receiving an assignment of a new, pre-hopped bandwidth segment for utilization in a next reverse link time slot. The computer-readable medium may further comprise instructions for receiving an instruction that assigns a new bandwidth segment at the user device and utilizing the new segment for a subsequent reverse link transmission if the pre-hopped segment is not assignable, and/or instructions for receiving a signal at the user device instructing the user device to provide on-demand pilot information related to a pilot channel utilized by the user device if the pre-hopped segment is determined not to be assignable.

A further aspect relates to a processor that executes computer-executable instructions for improving bandwidth utilization and supporting time-division duplexed beam-forming at a user device in a wireless communication environment, the instructions comprising, transmitting a signal over a bandwidth segment in a reverse link transmission, receiving a signal in a subsequent forward link time slot using the same bandwidth segment, and receiving an assignment of a new, pre-hopped bandwidth segment for utilization in a next reverse link time slot. The processor may additionally execute instructions for receiving an instruction that assigns a new bandwidth segment at the user device and utilizing the new segment for a subsequent reverse link transmission if the pre-hopped segment is not assignable, and/or for receiving a signal at the user device instructing the user device to provide on-demand pilot information related to a pilot channel utilized by the user device if the pre-hopped segment is determined not to be assignable.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
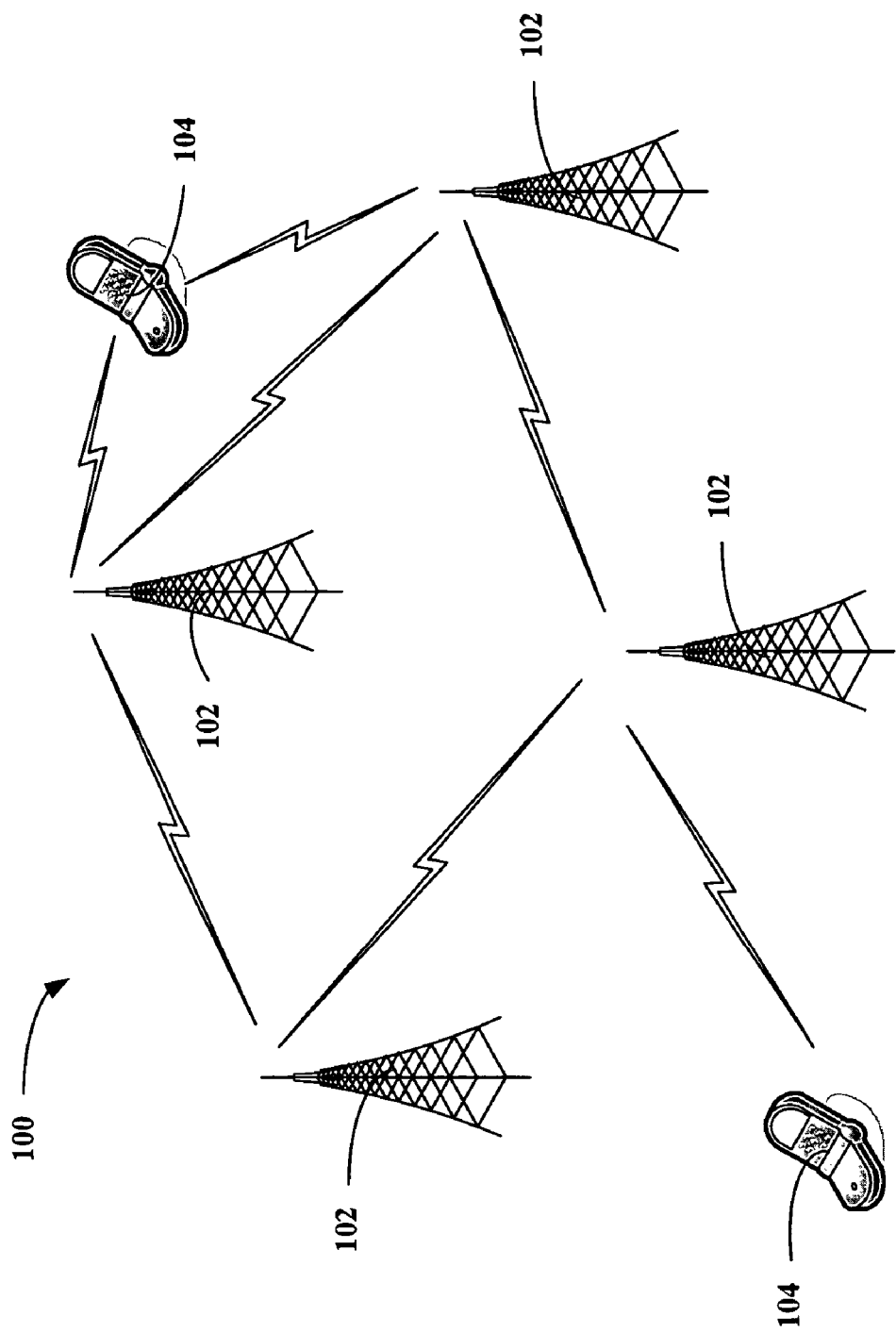
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term machine-readable medium" can include, without being limited to, wireless channels and various other media capable of storing, containing, and/or carrying instruction(s) and/or data.

Referring now to FIG. 1, a wireless network communication system 100 is illustrated in accordance with various embodiments presented herein. Network 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100.

In accordance with one or more aspects described herein, in cases where forward-link channel information is available at a base station 102, it may be possible to further improve the forward-link performance (e.g., higher sector throughput, lower latency, etc.) by employing advanced transmission and scheduling techniques such as beam-forming and/or frequency-sensitive scheduling. The effectiveness of these transmission techniques largely depends on the accuracy and quality of the forward-link channel estimates. The signaling overhead required to support such techniques can be prohibitive in an FDD deployment, where forward-link channel information must be explicitly transmitted back to base station 102 from user device 104. However, these advanced transmission techniques can be more realistically and efficiently supported in a TDD deployment due to the inherent channel reciprocity between the forward and the reverse links. With channel reciprocity, a reverse-link pilot can be an economical tool for providing an accurate forward-link channel estimate to base station 102.

Nonetheless, the cost associated with supplying a continuous wideband pilot on the reverse link in conventional systems can be prohibitive, especially when the reverse-link transmission occupies only a small part of the total bandwidth at any given time. However, in accordance with one or more aspects, base station 102 can direct a subset of mobile terminals 104 to transmit respective pilots using a specified time-frequency allocation in order to ensure that base station 102 always has access to the latest (forward-link) channel information of those terminals being scheduled (or about to be scheduled) while incurring a minimal amount of signaling overhead and resource consumption on the reverse link.

It should be noted that even in the absence of data transmission, a low-rate low-power pilot is usually still available on the reverse link to support a reverse-link control and signaling channel. Indeed, the control channel itself can be used as another source of pilot data to facilitate forward-link channel estimation (e.g., after a successful control channel demodulation, the control symbols can be re-encoded and used as a pilot). Thus, without incurring additional cost on the reverse link, base station 102 already has access to a reliable source to be used for channel estimation. The resulting channel estimate is accurate in the frequency region where the reverse-link pilot and/or the reverse-link control channel exist. As a result, the performance gain from beam-forming or other advanced transmission techniques that rely on channel reciprocity can only be enjoyed by users whose forward-link channels happen to utilize the frequency region previously occupied by their respective reverse-link pilot/control transmissions.

Figure 2:
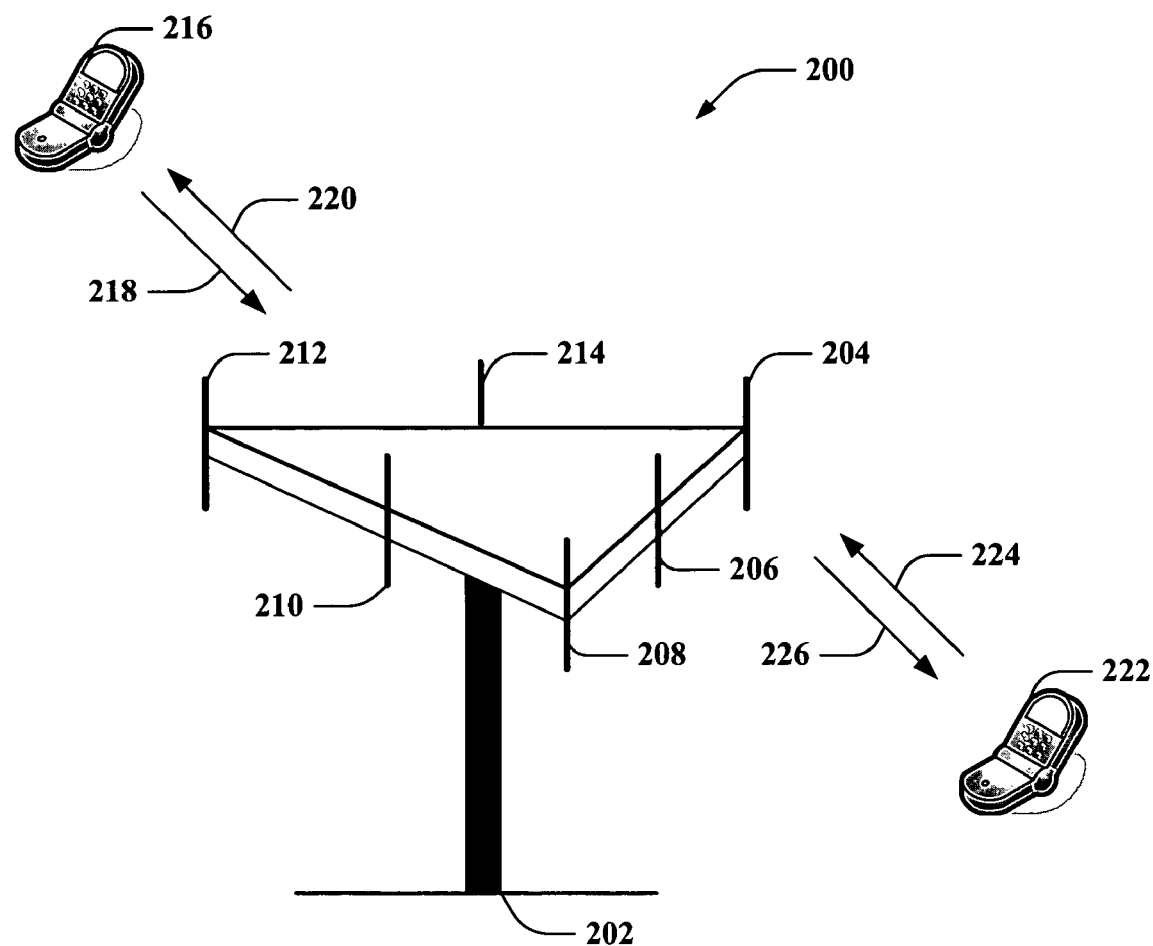
FIG. 2 is an illustration of a multiple access wireless communication system according to one or more embodiments.

Referring now to FIG. 2, a multiple access wireless communication system 200 according to one or more embodiments is illustrated. A 3-sector base station 202 includes multiple antenna groups: one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate is often referred to as a sector of base station 202. In one embodiment, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

According to an example, in a simple multi-carrier system where a user always transmits a pilot or control channel on a particular subset of sub-carriers (e.g., a bottom N/4 carriers out of N sub-carriers in an OFDMA system, a first carrier out of K CDMA carriers in a CDMA system, etc.), the base station can reliably estimate the channel on the forward-link over the frequency region occupied by the user's reverse-link pilot/control transmission. The base station can then schedule forward-link transmission over the same band as the user's pilot/control transmission. In doing so, a significant performance gain due to beam-forming or other advanced transmission techniques can be realized for such users. However, it may not always be possible to find the corresponding resource on the forward link; furthermore, the forward-link transmission may occupy a larger bandwidth than that spanned by the user's reverse-link pilot transmission. Finally, to fully benefit from frequency and interference diversity, frequency hopping is often employed (on both forward and reverse links), making it less likely for a user to receive forward-link transmission on the same frequency band as its reverse link transmission.

In order to overcome such conventional system obstacles, a resource allocation strategy is described herein that improves a user's chance of receiving a forward-link transmission that occupies a frequency region or subset of subcarriers spanned by the user's reverse-link pilot or control transmission in the preceding reverse-link time slot (thereby allowing the benefit of TDD channel reciprocity). Though various aspects set forth herein are primarily described with regard to a TDD OFDMA system, this technique is also applicable to other multi-carrier TDD systems such as MC-CDMA (e.g., MC-WCDMA), or any other suitable wireless communication system. In order to facilitate providing TDD channel reciprocity, various aspects can involve the concepts of constrained FL-RL hopping and/or on-demand RL pilot transmission.

Figure 3:
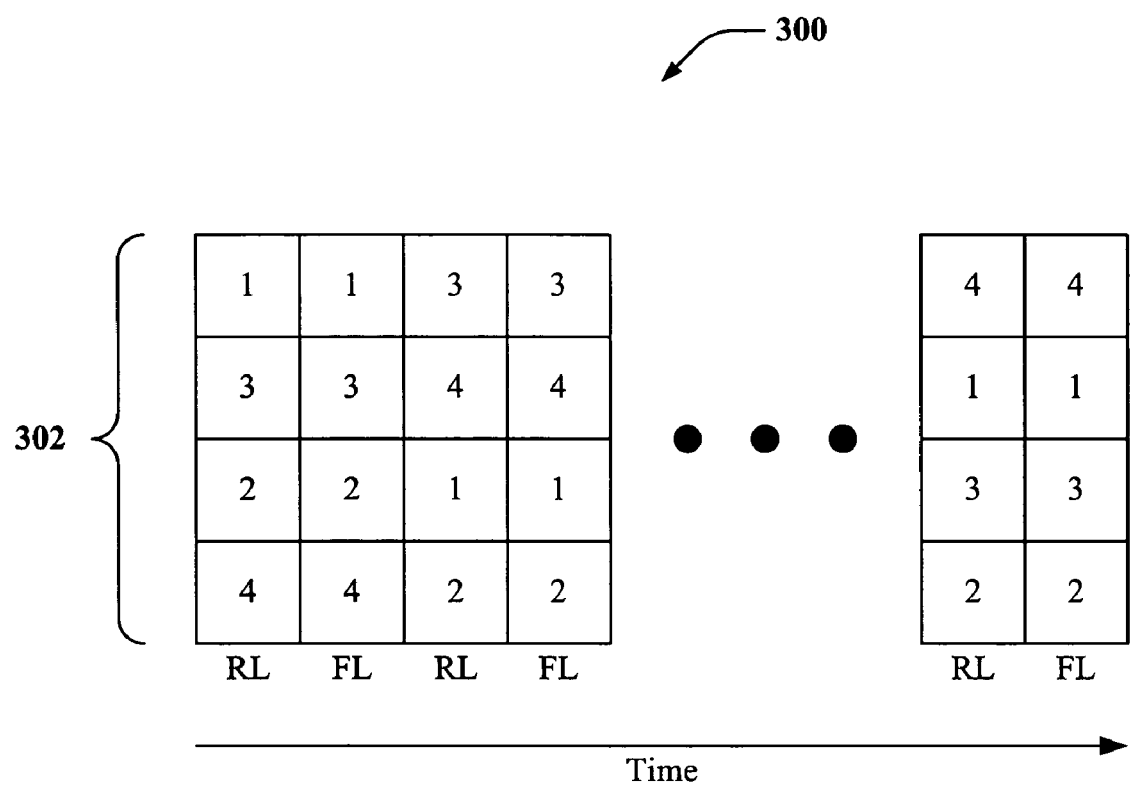
FIG. 3 is an illustration of a system that facilitates constrained frequency hopping in a TDD OFDMA wireless communication environment, in accordance with one or more aspects described herein.

FIG. 3 is an illustration of a system 300 that facilitates constrained frequency hopping in a TDD OFDMA wireless communication environment, in accordance with one or more aspects described herein. System 300 comprises a plurality of frequency segments, or subcarriers, 302. For example, system 300 can be an FH-OFDMA system with K non-overlapping frequency segments 302, where K is an integer (e.g., in this example, K=4) and wherein the same segmentation and hopping pattern can be used on both the forward and reverse links to permute the K segments 302, as indicated beneath each segment. Intra-segment hopping need not be restricted to be the same on the two links. In a TDD system, forward-link and reverse-link transmissions alternate in time.

Each user is assigned a particular logical segment (e.g., a pre-hopped segment) over which the reverse-link pilot/control channel may be transmitted (note that data transmission and its accompanying pilot may be transmitted on other segments). For example, a "pre-hopped" segment can be a bandwidth segment that is mapped to a current segment (e.g., a bandwidth segment presently in use), where the pre-hopped segment is utilized in a subsequent transmission. To further this example, a first pre-hopped segment 1 can be mapped to current segment 2, pre-shopped segment 2 can be mapped to current segment 4, and so on. It will be appreciated that "pre-hopped," as utilized in this context, relates to pre-mapping a resource such as a bandwidth segment, a subcarrier, frequency, etc., for use in a subsequent transmission.

To fully benefit from channel reciprocity, a base station can schedule a forward-link transmission over the same logical segment (e.g., by choosing the forward-link channel that occupies a subset of sub-carriers spanned by the segment).

Typically, the bandwidth occupied by each segment is larger than that used by a user at any given time. As such, multiple users can share the same segment in transmitting or receiving the information. In the event that the base station cannot identify a forward-link channel in the same logical segment, a user device can move its reverse-link transmission to be on the same logical segment as the forward-link transmission. Additionally and/or alternatively, the user device can supply an auxiliary reverse-link pilot (e.g., "on-demand" pilot) on the new segment. A change in a user device's logical segment for reverse-link transmission can be triggered by various mechanisms, including a scheduling message and/or explicit segment-change message from the base station. The auxiliary reverse-link pilot can also be additionally supplied on an appropriate segment when the forward-link transmission spans more than a single segment. In order to maximize advantages associated with channel reciprocity, segment hopping can be performed, for instance, once per FL/RL time slot. Intra-segment hopping (e.g., during forward-link data transmission) can be implemented to help garner frequency and interference diversity within the segment. Additionally and/or alternatively, a base station can always use channel information of other segments obtained in prior reverse link time slots. Any loss due to stale channel information may be minimal for users with low mobility. It will be appreciated to those skilled in the art that the above-described technique(s) are also applicable to a system employing a hybrid automatic request (H-ARQ) protocol.

It is to be understood that the segmentation need not necessarily span the entire forward-link or reverse-link time slots when control and data transmissions are time division multiplexed. For instance, the segmentation (and its associated hopping) may only be applied to reverse-link control transmission. During reverse-link data transmission, such segmentation and hopping need not be used. Similarly, such segmentation may be separately applied to forward-link data transmission, while forward-link control transmission may use entirely different segmentation and hopping patterns.

Referring to FIGS. 4-7, methodologies relating to supporting TDD beam-forming using constrained hopping and/or on-demand pilot information are illustrated. For example, methodologies can relate to TDD beam-forming support in an FDMA environment, an OFDMA environment, a CDMA environment, a WCDMA environment, a TDMA environment, an SDMA environment, or any other suitable wireless environment. Specifically, methodologies set forth herein are described with regard to a OFDMA wireless communication environment, although other types of communication environments (e.g., MC-CDMA, MC-WCDMA, . . . ) can be utilized in conjunction with the described aspects. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 4:
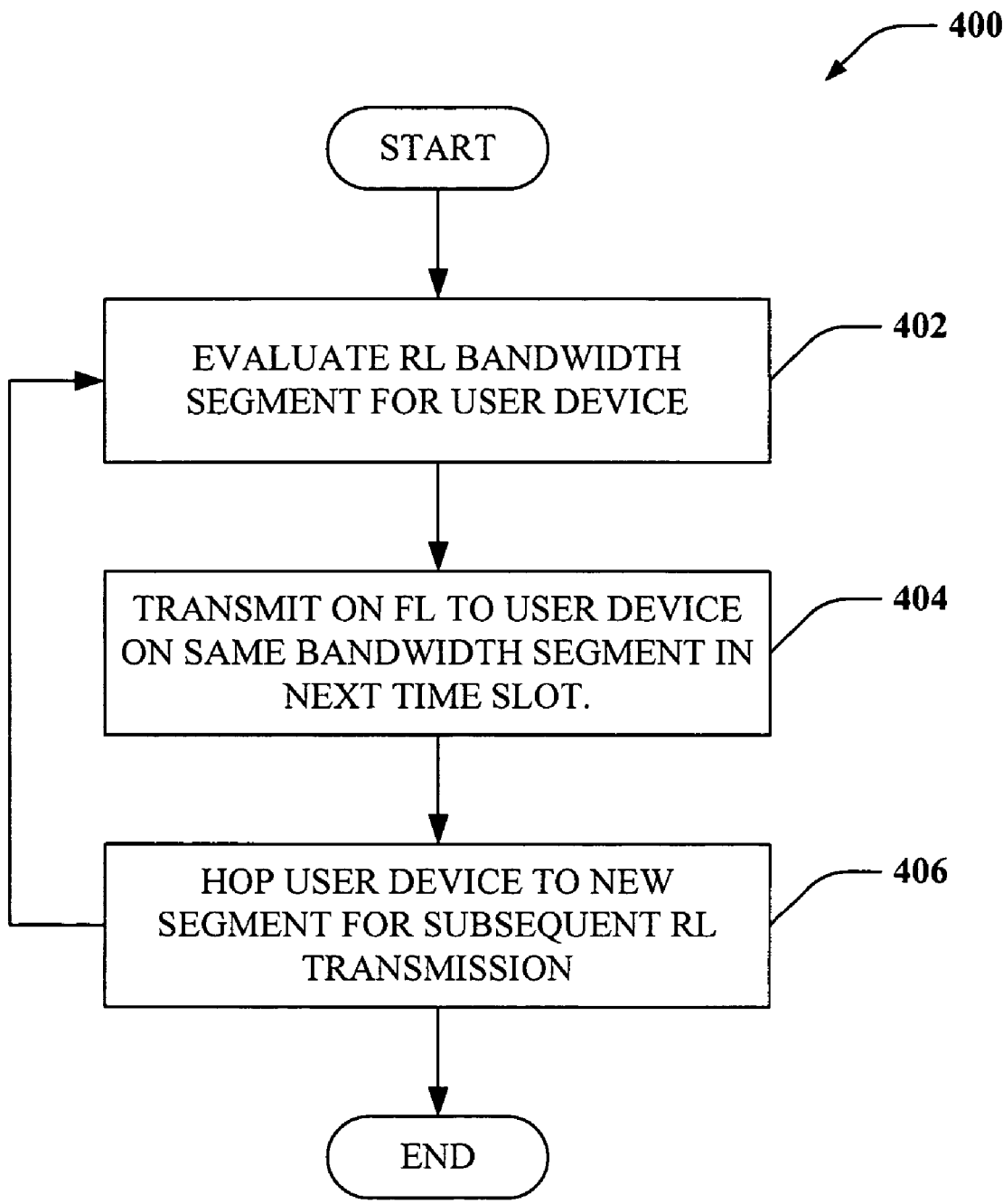
FIG. 4 illustrates a methodology for improving communication throughput in a wireless communication environment by transmitting a forward link communication signal on a same subcarrier as a received reverse link transmission and permuting subcarrier sets among user devices in a sector of a wireless communication system, in accordance with various aspects.

FIG. 4 illustrates a methodology 400 for improving communication throughput in a wireless communication environment by transmitting a forward link communication signal on a same subcarrier as a received reverse link transmission and permuting subcarrier sets among user devices in a sector of a wireless communication system, in accordance with various aspects. At 402, a received signal can be analyzed (e.g., at a base station) and a portion of total transmission bandwidth can be assessed over which the received signal was transmitted. For instance, if 20 MHz is allocated for communication signals, then according to the example of FIG. 3, each of the 4 subcarriers can occupy approximately 5 MHz of the allocated bandwidth. At 404, a forward link transmission to a user device can be performed using the same bandwidth segment employed by the user device for the reverse link transmission in the previous time slot. By evaluating the bandwidth segment for the user device at 402, a precise channel estimation can be generated for the forward link transmission at 404.

At 406, the user device can be hopped to a next bandwidth segment for a subsequent reverse link transmission to a base station. Hopping can be performed every reverse link time slot, every few time slots, every frame, etc., or according to any other suitable or desired schedule. Additionally, hopping can be performed such that total allocated bandwidth within a sector is divided equally or substantially equally between user devices communicating therein, and/or according to user device needs, etc., and subcarriers can be permuted through user devices upon each hopping event. In this manner, bandwidth segment hopping can be achieved in accordance with various aspects described herein. After transmission of a subsequent reverse link signal using the hopped bandwidth segment, the method 400 can revert to 402 for another iteration of reverse link bandwidth segment identification, after which a forward link transmission can be performed at 404, etc. Thus, method 400 provides an iterative process through which bandwidth segments utilized within a given communication sector can be permuted at the beginning of every reverse link time slot to increase interference diversity while providing highly accurate channel estimates for transmission on a next forward link. In this manner, forward link throughput can be increased without undue increases in processing overhead and the like, which in turn can increase overall throughput in a TDD wireless communication environment.

Figure 5:
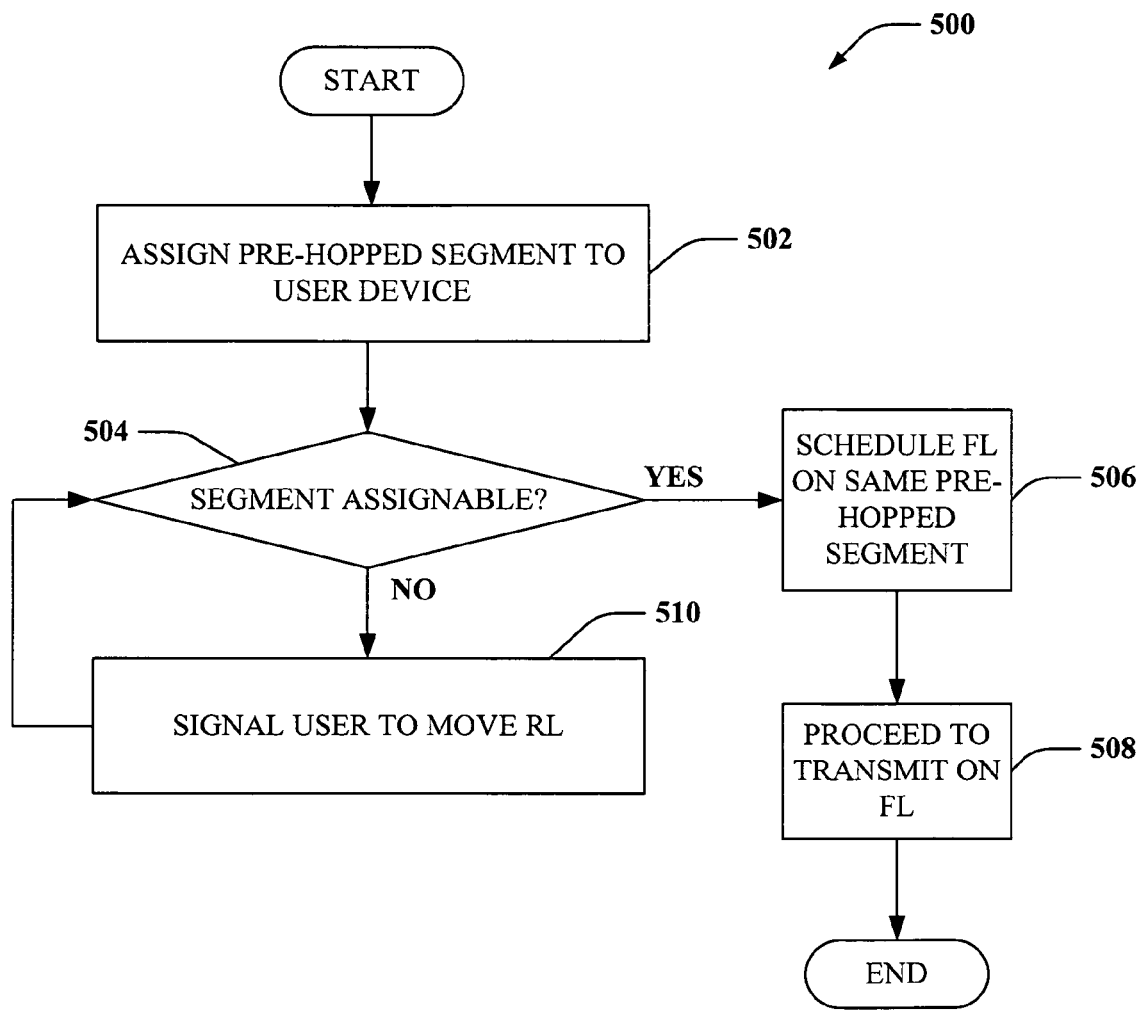
FIG. 5 is an illustration of a methodology for increasing interference diversity in a TDD wireless communication environment, in accordance with various aspects.

FIG. 5 is an illustration of a methodology 500 for increasing interference diversity in a TDD wireless communication environment, in accordance with various aspects. At 502, a "pre-hopped" subcarrier, or segment, can be assigned to a user device, via which the user device can transmit a signal on a reverse link. At 504, a determination can be made regarding whether the segment is assignable (e.g., whether the segment is presently assigned to another user, etc.) If the segment is determined the be assignable at 504, then at 506, a forward link transmission can be scheduled using the same pre-hopped subcarrier frequency and/or bandwidth. At 508, transmission can be performed on the forward link back to the user device using the same pre-hopped segment employed by the user device on the previous reverse link.

If, at 504, it is determined that the subcarrier segment is not assignable, then at 510, a signal can be transmitted to the user device move to a new transmission bandwidth for a next reverse link transmission. The method can then revert to 504 for verification that the new reverse link segment is assignable. Because the base station provides the signal instruction the user device to hop to a new bandwidth segment, the base station knows which segment the user device will employ and therefore can efficiently receive and demodulate a subsequent uplink transmission.

According to an example, a base station can glean information related to a pilot from a user device transmitter, and can evaluate different phases at its antennas, which can be employed by the base station on the forward link to ensure that a transmission on the forward link is in phase. Recent and reliable channel estimates from a user device can facilitate such subcarrier reuse on the forward link. For instance, a user device can transmit a wide band pilot, a control channel, etc., which can be employed by the base station to obtain wideband channel information. A TDM control channel that occurs, for instance, once every 4 milliseconds can be employed, such that just before end of a reverse-link time slot, a control slot is present for transmitting a channel quality indicator (CQI) channel that is used as a pilot. To mitigate pilot signal dilution associated with having a control channel span the entire bandwidth (e.g., as bandwidth increases) the control channel can be transmitted on, for instance, an approximately 5 MHz segment of bandwidth. Thus, according to the example, the reverse link time slot bandwidth can be divided into segments of about 5 MHz, which in turn can result in division of the forward link into segments of about 5 MHz, so that the user may be scheduled on the forward link for the same 5 MHz segment on which the control channel was transmitted. In this manner, constrained hopping can be implemented such that the reverse link hops in synchronicity with the forward link. It will be appreciated that the approximate 5 MHz segment size described with regard the above example is not intended to limit the scope of the various aspects set forth herein, and that larger or smaller segment sizes can be employed in conjunction therewith, as will be appreciated by one skilled in the art.

Figure 6:
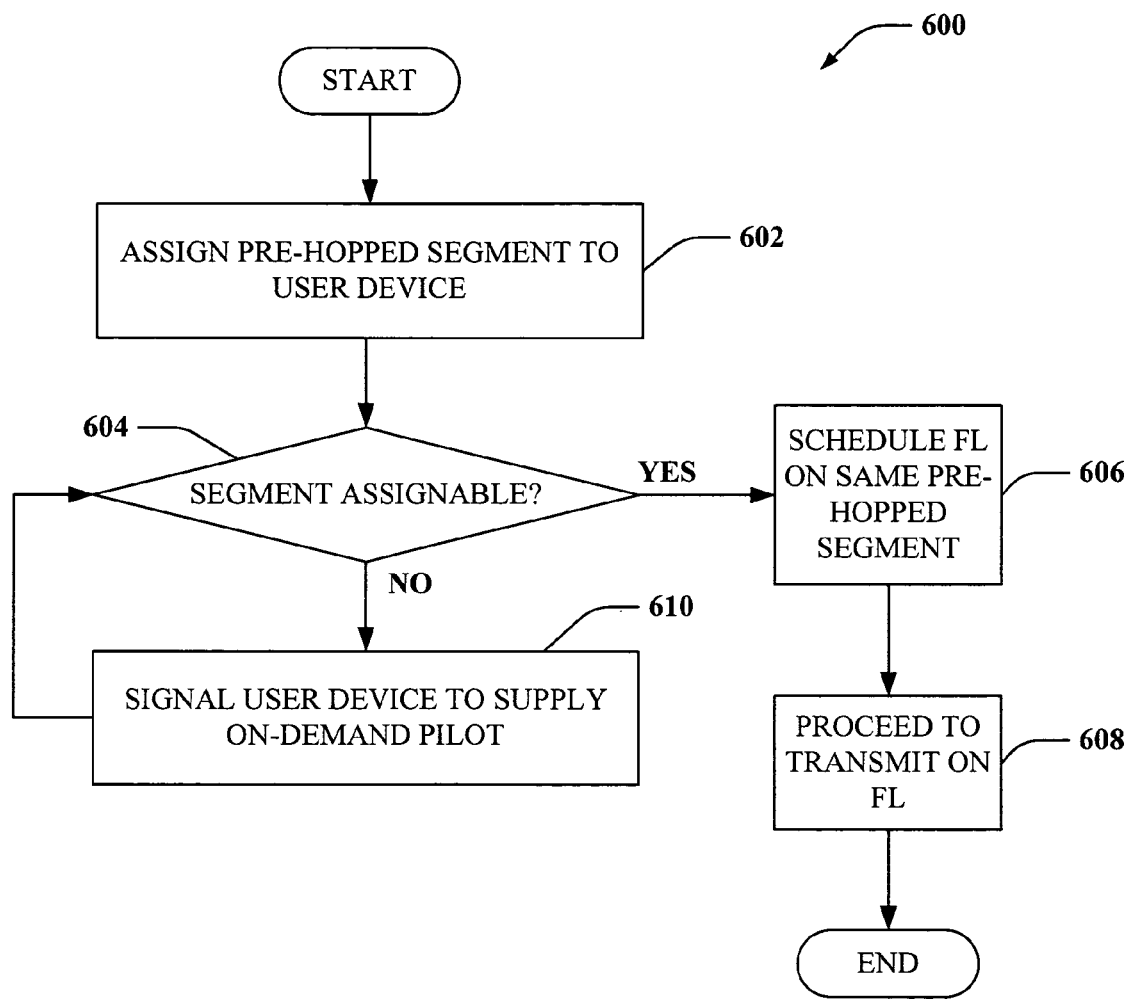
FIG. 6 is an illustration of a methodology for increasing interference diversity and communication throughput in a TDD wireless communication environment, in accordance with one or more aspects.

FIG. 6 is an illustration of a methodology 600 for increasing interference diversity and communication throughput in a TDD wireless communication environment, in accordance with one or more aspects. Method 600 is similar to method 500, described above, and presents a variation on the manner in which an assignable segment can be addressed. At 602, a "pre-hopped" subcarrier, or segment, can be assigned to a user device, by way of which the user device can transmit a signal on a reverse link. At 604, a determination can be made regarding whether or not the pre-hopped segment is assignable (e.g., whether the segment is already assigned, locatable, etc.). If the determination is positive with regard to the assignability of the segment, a forward link transmission can be scheduled using the same pre-hopped subcarrier frequency and/or bandwidth, at 606. At 608, transmission can be performed on the forward link back to the user device using the same pre-hopped segment employed by the user device on the previous reverse link time slot.

If, at 604, it is determined that the subcarrier segment utilized for the received reverse link transmission is not assignable, then at 610, a signal can be transmitted to the user device to provide and "on-demand" pilot. For example, in a wideband communication environment that utilizes a approximately 10-15 MHz, then the user can be scheduled on a different segment (e.g., approximately 5 MHz, . . . ) and can transmit the specific segment information to the base station on a next uplink transmission. The method can then revert to 604 for verification that the new reverse link segment is assignable. Thus, the user device can be signaled by the base station to transmit to the base station information related to subcarrier(s) and/or bandwidth segment(s) utilized by the user device to transmit on the reverse link. The base station can thus be provided with accurate pilot information to facilitate estimating a channel for forward link transmission in a subsequent transmission time slot.

Figure 7:
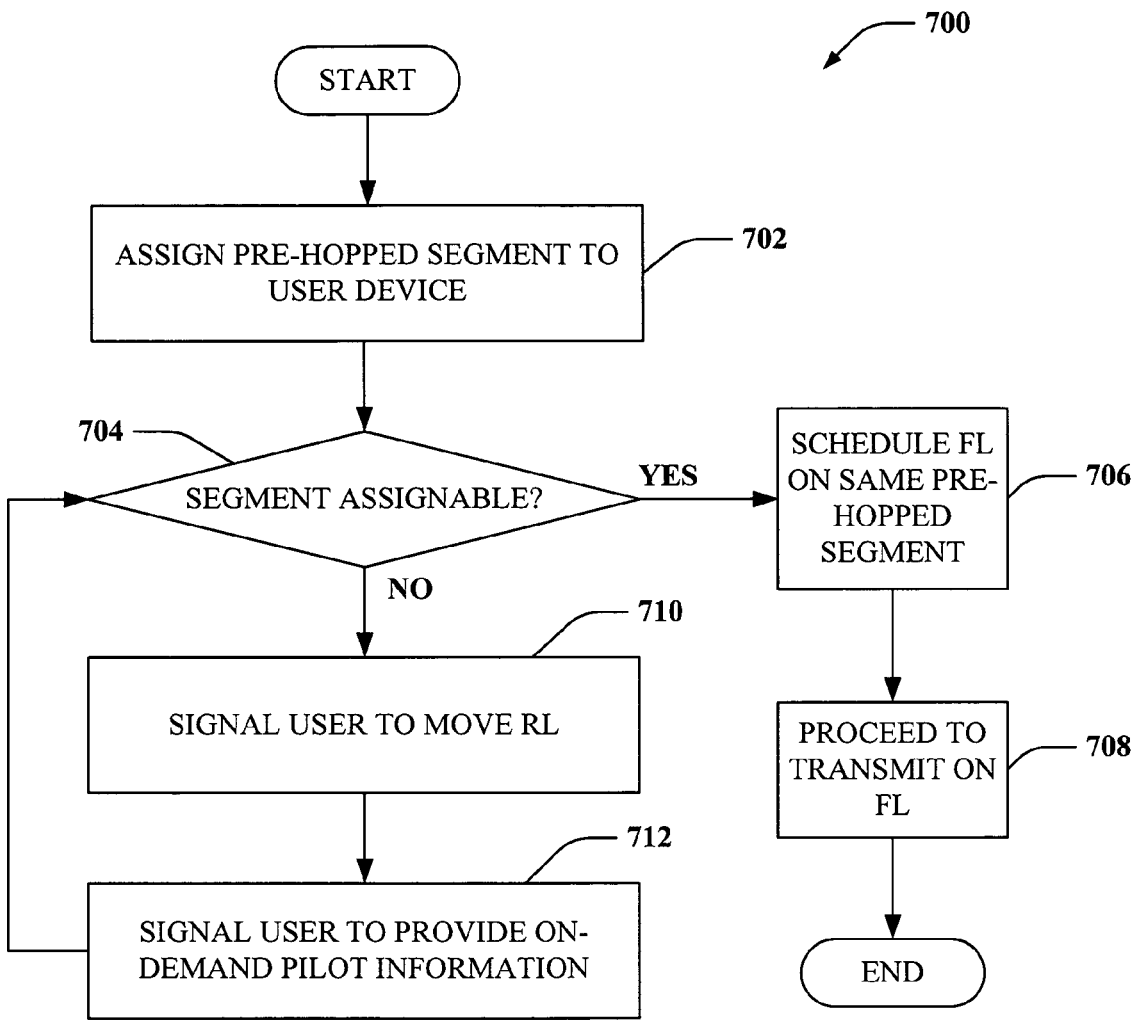
FIG. 7 illustrates a methodology for employing a dual protocol that facilitates redundantly ascertaining a bandwidth segment utilized by a user device for an uplink transmission and employing the ascertained segment for a downlink transmission in a subsequent transmission timeslot.

FIG. 7 illustrates a methodology 700 for employing a dual protocol that facilitates redundantly ascertaining a bandwidth segment utilized by a user device for an uplink transmission and employing the ascertained segment for a downlink transmission in a subsequent transmission timeslot. At 702, a pre-hopped segment can be assigned to a user device for uplink transmission. At 704, a determination can be made as to whether the pre-hopped segment is assignable (e.g., whether the segment is occupied or otherwise not assignable, . . . ). If the segment is determined to be assignable at 704, then at 706, the same bandwidth segment can be utilized to schedule a forward link transmission to the user device in a subsequent time slot at 706. At 708 the base station can proceed to transmit to the user device on the downlink using the assigned pre-hopped bandwidth segment. If the segment is determined not to be assignable at 704, then at 710 the user can be signaled to switch to another segment of bandwidth for a next uplink transmission.

The signal provided at 710 can comprise, for instance, an instruction to move to a specific bandwidth segment identified by the base station, such that the base station has pre-identified the bandwidth segment that will be utilized for a subsequent downlink transmission. Additionally and/or alternatively, the signal provided at 710 can comprise an instruction to move to any available bandwidth segment, in which case the signal can further comprise an instruction to provide on-demand pilot information to the base station on an uplink transmission using the new bandwidth segment, at 712. The method can then revert to 704, where the on-demand pilot information related to the segment to which the user device has switched can be assessed to verify that it is available for assignment. In this manner, the base station can receive on demand pilot information during periods of high system throughput without being required to expend resources related to pilot channel evaluation and the like.

It will be appreciated that, in accordance with one or more aspects described herein, inferences can be made regarding constrained hopping, on-demand reverse link pilot transmission, optimization thereof, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding optimization of segment size when hopping bandwidth segments for a user device, etc. For instance, an initial, predetermined segment size (e.g., 3 MHz, 5 MHz, 6 MHz, . . . ) can be defined and utilized as a starting point from which segment size optimization can proceed. To further this example, if an initial amount of bandwidth in a wireless communication time slot is 20 MHz, then four segments of approximately 5 MHz can be delineated and assigned to different user devices in a sector. Inferences can be made based at least in part on user bandwidth usage, requirements, and the like, that one or more users are not utilizing the full 5 MHz segment assigned thereto. For instance, a user transmitting a text message may mot require as much bandwidth as a user uploading a digital photo, carrying on a voice communication, etc. In such a case, that user's excess bandwidth can be reallocated to a user with greater bandwidth requirements, to an additional user in the sector, earmarked as bandwidth to be utilized as guard bands between user-assigned segments, etc.

According to another example, inferences can be made relating to when to hop a user device segment assignment based at least in part on, for instance, user device movement, etc. For instance, it may be desirable to hop a user to a particular bandwidth segment as the user enters a perimeter area between two sectors, in order to facilitate providing a smooth transition from a first serving sector base station to a subsequent serving sector base station, and the like. It will be appreciated that the foregoing examples are illustrative in nature and are not intended to limit the number of inferences that can be made or the manner in which such inferences are made in conjunction with the various embodiments and/or methods described herein.

Figure 8:
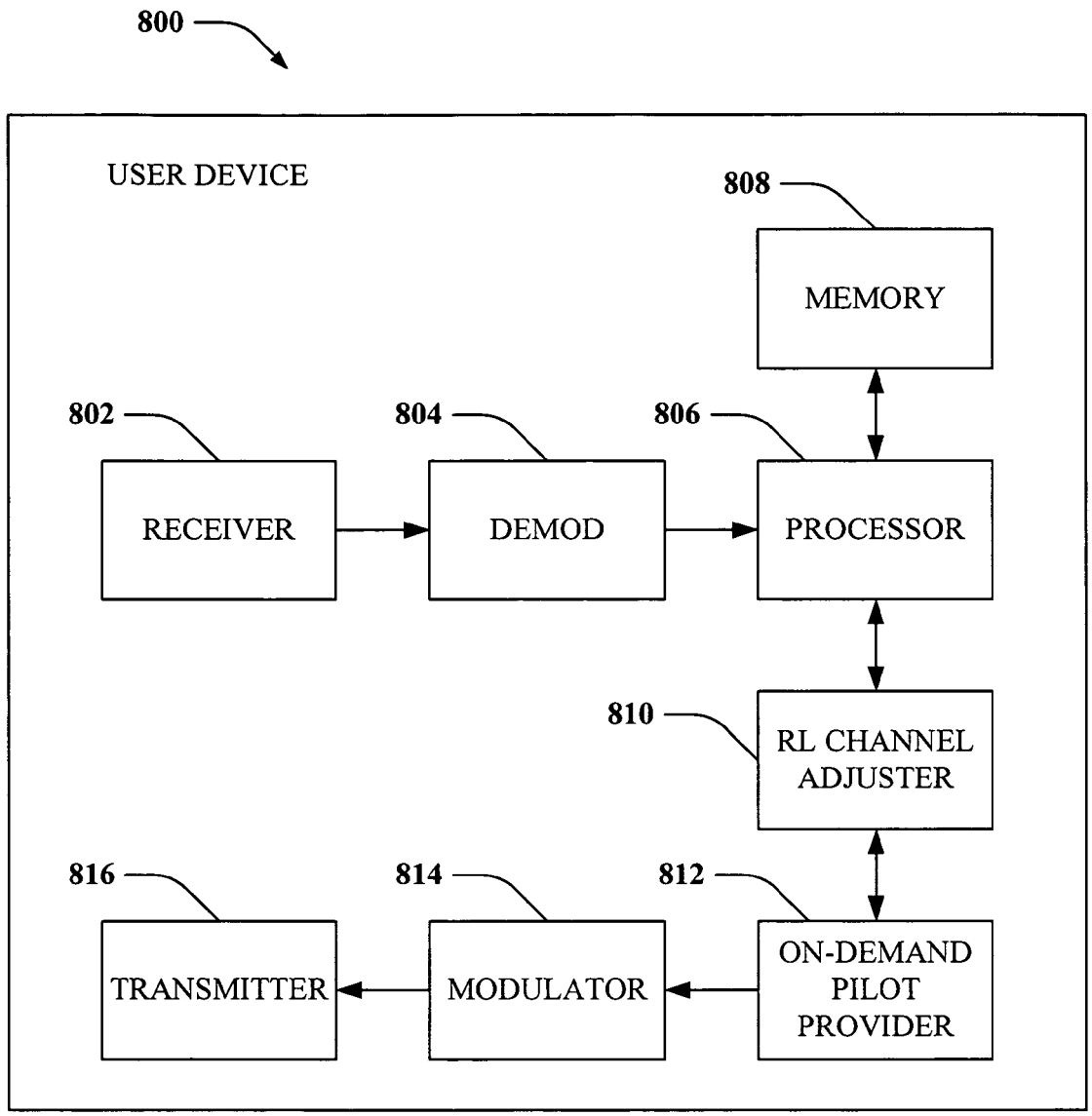
FIG. 8 is an illustration of a user device that facilitates constrained forward link-reverse link hopping and retrieving on-demand pilot information in a wireless communication environment in accordance with one or more aspects set forth herein.

FIG. 8 is an illustration of a user device 800 that facilitates constrained forward link-reverse link hopping and retrieving on-demand pilot information in a wireless communication environment in accordance with one or more aspects set forth herein. User device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. A demodulator 804 can demodulate and provide received pilot symbols to a processor 806 for channel estimation. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to a bandwidth segment assigned to user device 800, a constrained hopping protocol, lookup table(s) comprising information related thereto, and any other suitable information for supporting TDD beam-forming in a wireless communication system as described herein. Memory 808 can additionally store protocols associated with hopping bandwidth segments when directed by a base station, providing on-demand pilot information in response to a request there for, etc., such that user device 800 can employ stored protocols and/or algorithms to achieve TDD beam-forming support as described herein.

It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 808 of the subject systems and methods is intended to comprise, without being limited to, these and any other suitable types of memory.

Processor 806 is further coupled to a reverse-link channel adjuster 810 that can facilitate transmitting a signal on an uplink using a bandwidth segment assigned by a base station to which the signal is transmitted. Channel adjuster 810 can further switch bandwidth segments as directed by a base station, for instance, upon receiving an instruction to hop segments from the base station. User device can furthermore comprise an on demand pilot information providing component 812 that provides pilot channel information to a base station in response to a request from the base station that such information be provided to facilitate utilizing a same pilot on a downlink transmission from the base station. User device 800 still further comprises a symbol modulator 814 and a transmitter 816 that transmits the modulated signal over an assigned uplink bandwidth segment.

Figure 9:
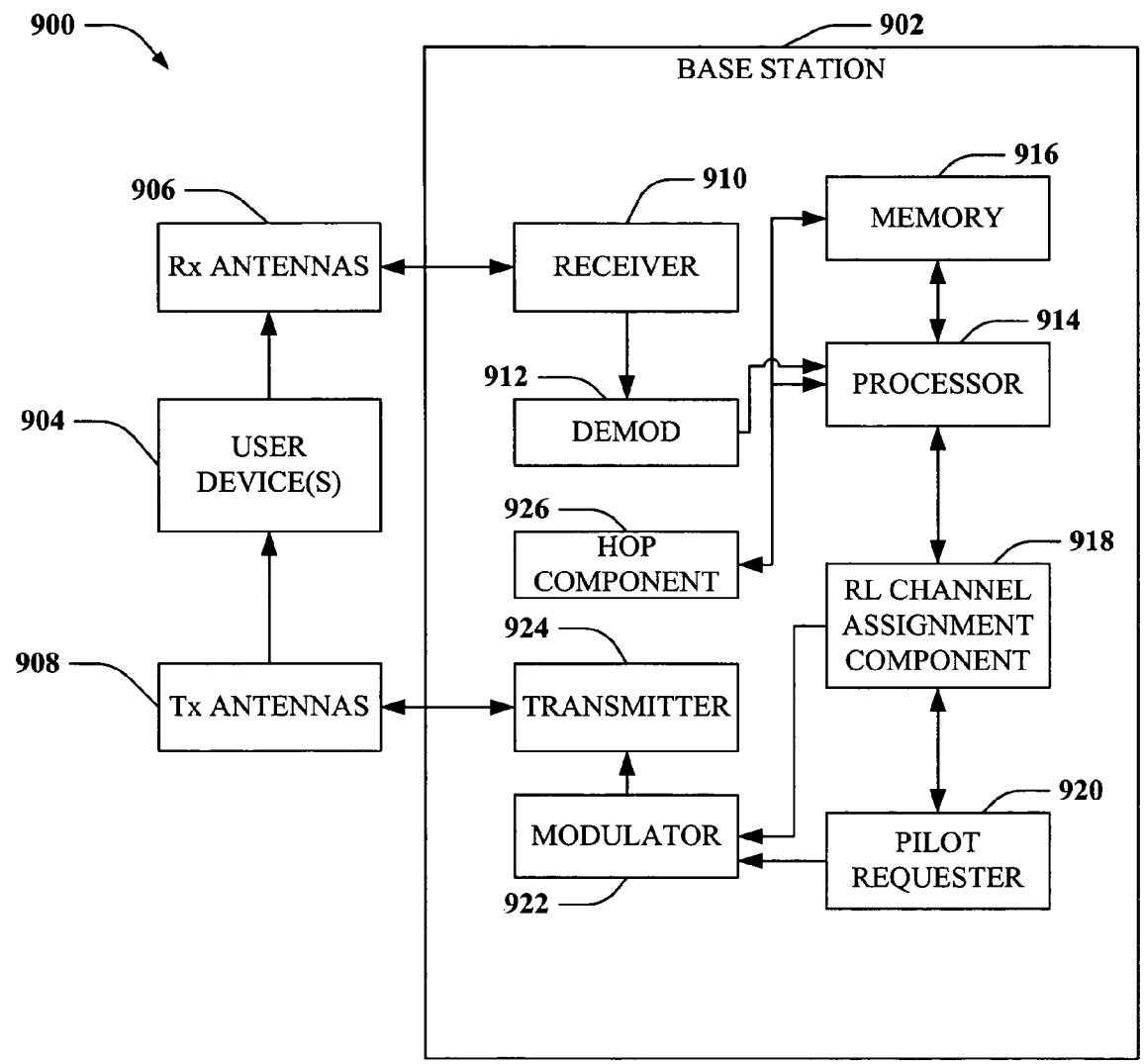
FIG. 9 is an illustration of a system that facilitates increasing system capacity in a wireless communication environment in accordance with various aspects.

FIG. 9 is an illustration of a system 900 that facilitates increasing system capacity in a wireless communication environment in accordance with various aspects. System 900 comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above with regard to FIG. 8, and which is coupled to a memory 916 that stores information related to bandwidth segments, segment assignments/reassignments to user devices, hopping protocols, lookup tables related thereto, and/or any other suitable information related to performing the various actions and functions set forth herein. Processor 914 is further coupled to a a reverse link channel assignment component 918 that assigns bandwidth segments to user devices 904. Processor 914 can additionally encode a portion of a signal with an instruction for a user device to direct the user device to hop to a new bandwidth segment (e.g., a newly assigned segment, where the instruction is provided in the event that the segment over which the received signal was transmitted cannot be ascertained, in the event that the user device is due for a hop to a new segment according to a predefined schedule or table, . . . ). A modulator 922 can multiplex the signal for transmission by a transmitter 924 through transmit antenna 908 to user devices 904.

Base station 902 further comprises pilot requester component 920, which request that a particular user device 904 provide its pilot sequence information on demand. For example, pilot requester 920 can provide an instruction directing user device 904 to transmit information related to a pilot channel being employed thereby to permit base station 902 to employ the pilot channel in a subsequent downlink transmission. Additionally, base station 902 can comprise a hop component 926 that is operatively associated with each of processor 914 and memory 916. Hop Component 926 can monitor user devices 904 in a sector, which are assigned to various segments of bandwidth, and can facilitate segment hopping to reduce interference and/or to improve system efficiency. Such segment hopping can be performed according to a predefined schedule (e.g., after each forward link transmission, after a predefined number of forward link transmissions, after a given time period, . . . ) stored in memory 916. In this manner, a total amount of bandwidth can be divided into a plurality of segments that can be separately assigned to user devices to increase throughput in a wireless communication system while maintaining service integrity and enhancing users' communication experience.

Figure 10:
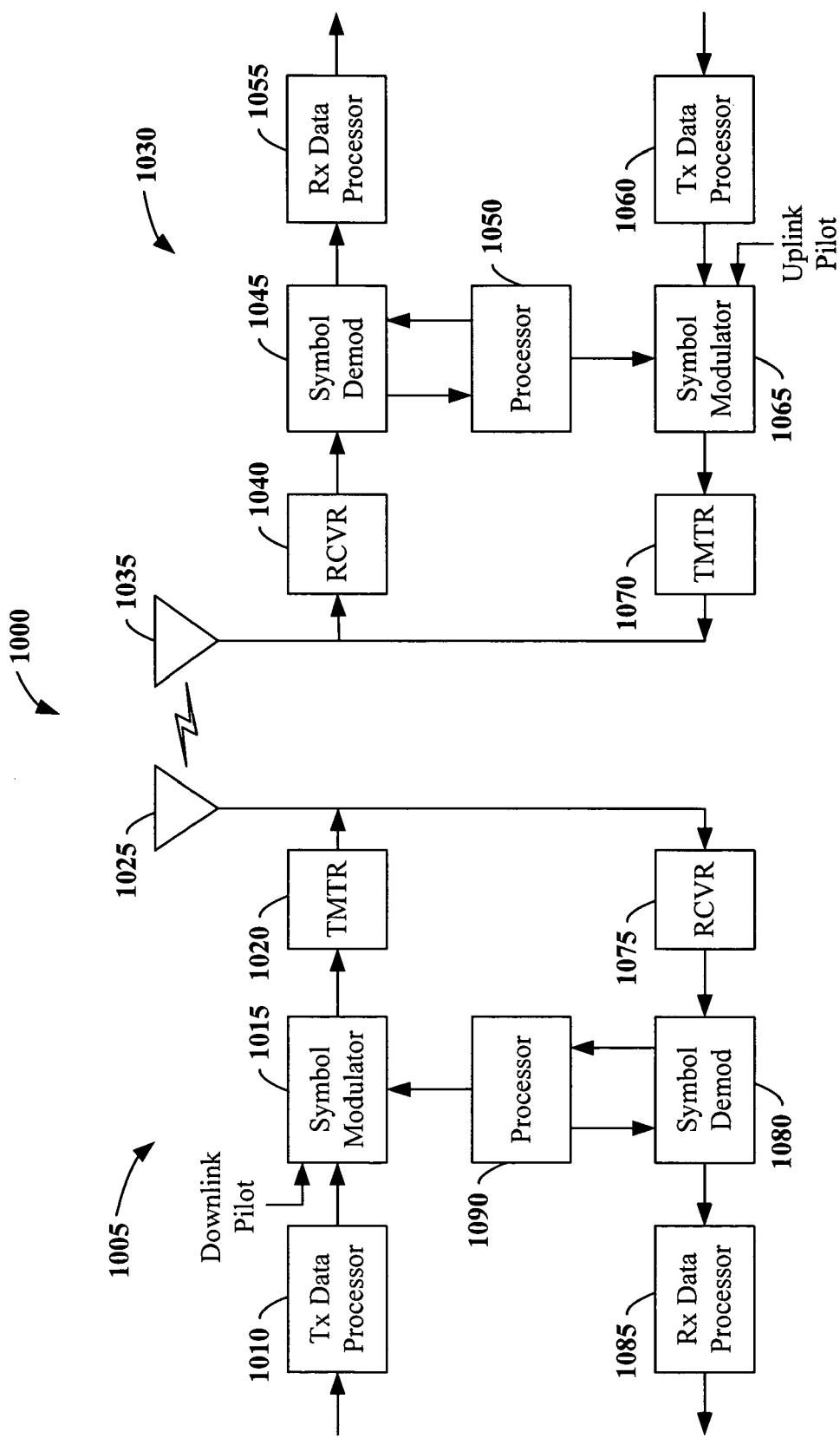
FIG. 10 is an illustration of a wireless network environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-3 and 8-9) and/or methods (FIGS. 4-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

Figure 11:
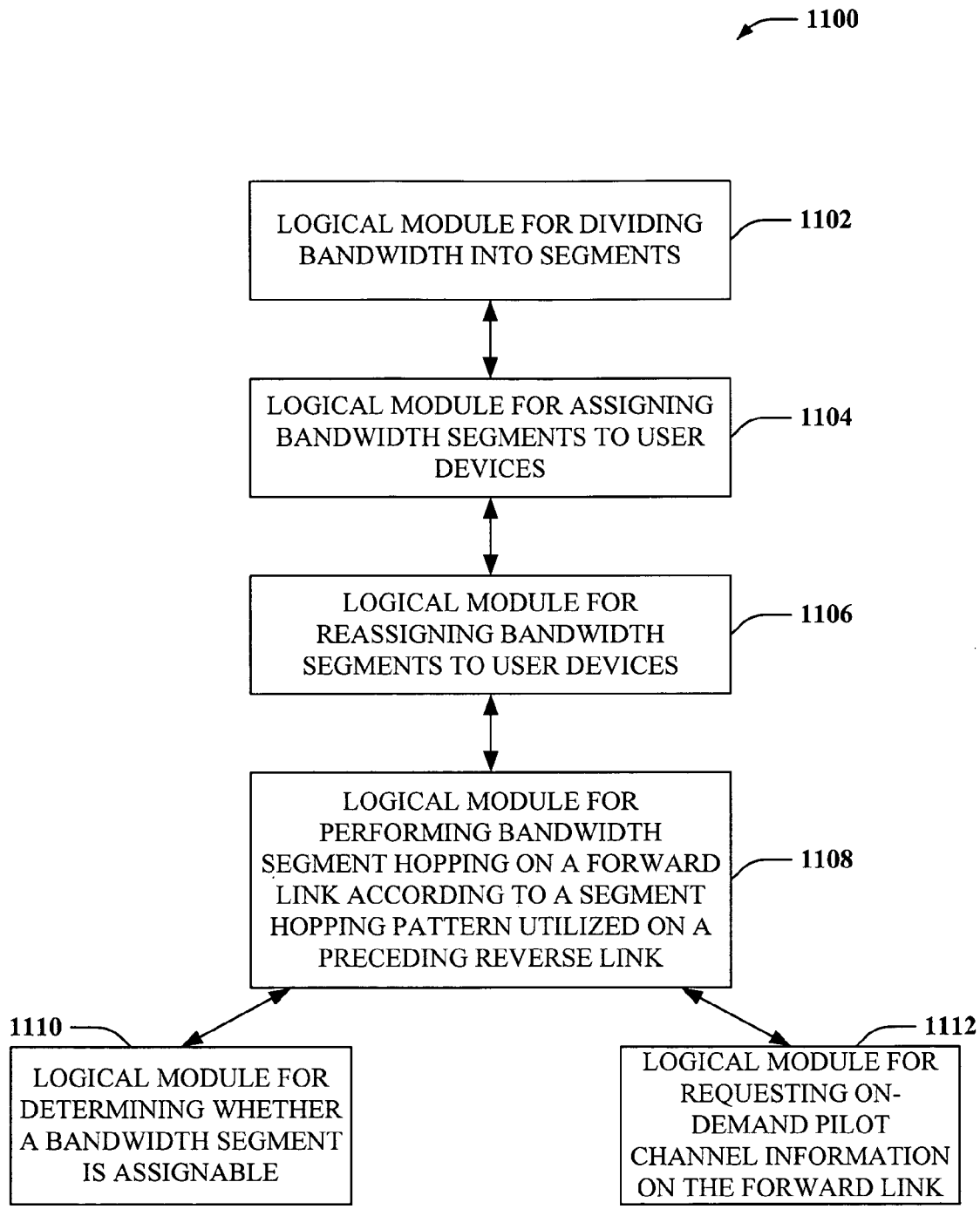
FIG. 11 is an illustration of a system that facilitates constrained forward link-reverse link hopping, in accordance with various aspects set forth herein.

FIG. 11 is an illustration of a system 1100 that facilitates performing segment hopping on a forward link according to a segment hopping pattern utilized in a preceding reverse link, in accordance with various aspects. System 1100 is represented as a series of interrelated functional blocks, which can represent functions implemented by a processor, software, or combination thereof (e.g., firmware). System 1100 comprises a logical module for dividing available bandwidth into a plurality of segments 1102, which is operatively coupled to a logical module for assigning the bandwidth segments 1104 to one or more user devices. System 1100 further comprises a logical module for reassigning bandwidth segments to user devices 1106, and a logical module for performing bandwidth segment hopping on a forward link 1108 according to a bandwidth segment hopping pattern utilized in a preceding reverse link. System 1100 may still further comprise means for determining whether a particular bandwidth segment is assignable 1110 (e.g., whether the segment has been previously assigned, is occupied, etc.), as well as a logical module for requesting on-demand pilot channel information on a forward link, as discussed above with regard to the preceding figures. It is to be understood that system 1100 and the various logical modules comprised thereby may carry out the methods described above and/or may impart any necessary functionality to the various systems described herein.

Figure 12:
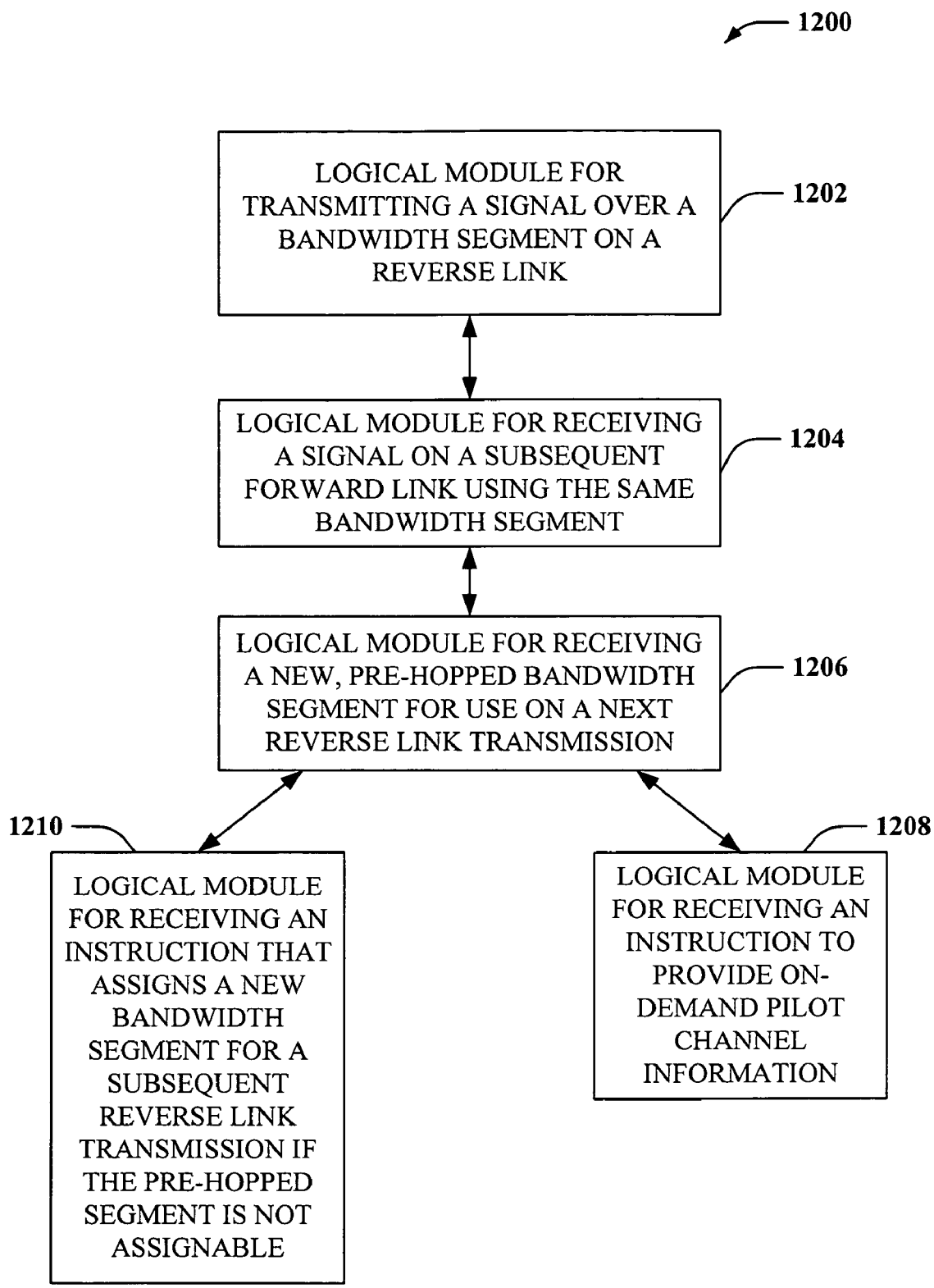
FIG. 12 is an illustration of a system that facilitates constrained forward link-reverse link hopping, in accordance with various aspects set forth herein.

FIG. 12 is an illustration of a system 1200 that facilitates constrained forward link-reverse link hopping, in accordance with various aspects set forth herein. System 1200 is represented as a series of interrelated functional blocks, which can represent functions implemented by a processor, software, or combination thereof (e.g., firmware). System 1200 comprises a logical module for transmitting a signal on a bandwidth segment over a reverse link 1204, which is operatively coupled to a logical module for receiving a signal on the same bandwidth segment over a subsequent forward link. The system 1200 further comprises a logical module for receiving a new, pre-hopped bandwidth segment 1206 for use on a next reverse link transmission. In the event that the new pre-hopped segment is unable to be assigned (e.g., it is occupied or otherwise unavailable), system 1200 may comprise a logical module for receiving and instruction to provide on-demand pilot channel information 1208 to a base station attempting to communicate with a device employing system 1200. Additionally or alternatively, system 1200 may comprise a logical module for receiving an instruction that assigns a new bandwidth segment for use on a subsequent reverse link transmission 1210 if the pre-hopped segment is unable to be assigned. It is to be understood that system 1200 and the various logical modules comprised thereby may carry out the methods described above and/or may impart any necessary functionality to the various systems described herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of improving bandwidth utilization and supporting time-division duplexed beam-forming in a wireless communication environment, comprising:
   evaluating a bandwidth segment utilized by a user device in a received reverse link transmission;
   transmitting a signal to the user device in a subsequent forward link time slot using the same bandwidth segment;
   determining whether a pre-hopped bandwidth segment is assignable to the user device for utilization in a next reverse link time slot; and
   performing at least one of assigning a new bandwidth segment to the user device and instructing the user device to provide on-demand pilot information if the pre-hopped bandwidth segment is not assignable to the user device.

2. The method of claim 1, further comprising assigning the pre-hopped bandwidth segment to the user device for utilization in the next reverse link time slot if it is determined that the pre-hopped bandwidth segment is assignable, and hopping bandwidth segments on a forward link according to a segment hopping pattern utilized in a preceding reverse link.

3. The method of claim 2, wherein determining whether the pre-hopped bandwidth segment is assignable comprises determining whether the pre-hopped bandwidth segment is assigned to another user device.

4. The method of claim 3, further comprising scheduling a forward link transmission on the assigned pre-hopped segment.

5. The method of claim 4, wherein available bandwidth for communication between the apparatus and a plurality of user devices is divided into segments of approximately 5 MHz.

6. The method of claim 3, further comprising transmitting an instruction to the user device directing the user device to utilize the new bandwidth segment for a subsequent reverse link transmission if the pre-hopped bandwidth segment is not assignable.

7. The method of claim 1, wherein the wireless communication environment is a TDD OFDMA wireless communication environment.

8. The method of claim 1, wherein the wireless communication environment is a TDD WCDMA wireless communication environment.

9. A non-transitory computer readable medium having stored thereon computer executable instructions operable to cause the medium to cause the computer to:
  ascertain a bandwidth segment utilized by a user device in a received reverse link transmission;
  transmit a signal in a subsequent forward link time slot using the ascertained bandwidth segment;
  determine whether a pre-hopped bandwidth segment is assignable to the user device for utilization in a next reverse link time slot;
  perform at least one of assigning a new bandwidth segment to the user device and instructing the user device to provide on-demand pilot information if the pre-hopped bandwidth segment is not assignable to the user device;
  assign the pre-hopped bandwidth segment to the user device for utilization in the next reverse link time slot if it is determined that the pre-hopped bandwidth segment is assignable; and
  hopping bandwidth segments on a forward link according to a segment hopping pattern utilized in a preceding reverse link.

10. The non-transitory computer-readable medium of claim 9, further comprising instructions causing the computer to: transmit the forward link signal if the pre-hopped bandwidth segment is assignable.

11. The non-transitory computer-readable medium of claim 9, further comprising instructions causing the computer to: transmit a new bandwidth segment assignment to the user device and directing the user device to utilize the new bandwidth segment for a subsequent reverse link transmission if the pre-hopped bandwidth segment is not assignable.

12. A method for increasing throughput in a wireless communication environment, comprising:
  receiving a reverse link signal from a user device over a bandwidth segment;
  transmitting a signal in a subsequent forward link time slot over the same bandwidth segment;
  determining whether a pre-hopped bandwidth segment is assignable to the user device for utilization in a next reverse link time slot;
  performing at least one of assigning a new bandwidth segment to the user device for utilization in the next reverse link time slot and instructing the user device to provide on-demand pilot information if the pre-hopped bandwidth segment is not assignable to the user device; and
  hopping bandwidth segments on a forward link according to a segment hopping pattern utilized in a preceding reverse link.

13. The method of claim 12, further comprising transmitting the forward link signal if the new bandwidth segment is assignable.

14. The method of claim 12, further comprising transmitting an alternate bandwidth segment assignment to the user device if the new bandwidth segment is not assignable.

15. A method of improving bandwidth utilization and supporting time-division duplexed beam-forming at a user device in a wireless communication environment, comprising:
  transmitting a signal over a bandwidth segment in a reverse link transmission;
  receiving a signal in a subsequent forward link time slot using the same bandwidth segment;
  receiving an assignment of a pre-hopped bandwidth segment for utilization in a next reverse link time slot if the pre-hopped bandwidth segment is assignable; and
  receiving at least one of an assignment of a new bandwidth segment and an instruction to provide on-demand pilot information if the pre-hopped bandwidth segment is not assignable.

16. The method of claim 15, wherein available bandwidth for communication is divided into segments of approximately 5 MHz.

17. The method of claim 15, further comprising utilizing the new bandwidth segment for a subsequent reverse link transmission if the pre-hopped bandwidth segment is not assignable.

18. The method of claim 15, wherein the wireless communication environment is a TDD OFDMA wireless communication environment.

19. The method of claim 15, wherein the wireless communication environment is a TDD WCDMA wireless communication environment.

20. An apparatus that facilitates improving bandwidth utilization and supporting time-division duplexed beam-forming at a user device in a wireless communication environment, comprising:
  a transmitter that transmits a signal over a bandwidth segment in a reverse link transmission; and
  a receiver that receives a signal in a subsequent forward link time slot using the same bandwidth segment utilized in the reverse link transmission, receives an assignment of a pre-hopped bandwidth segment for utilization in a next reverse link time slot if the pre-hopped bandwidth segment is assignable, and receives at least one of an assignment of a new bandwidth segment and an instruction to provide on-demand pilot information if the pre-hopped bandwidth segment is not assignable;
  wherein the transmitter transmits a signal using the pre-hopped bandwidth segment in the next reverse link time slot if the pre-hopped bandwidth segment is assignable.

21. The apparatus of claim 20, wherein available bandwidth for communication is divided into segments of approximately 5 MHz.

22. The apparatus of claim 20, wherein the new bandwidth segment is utilized for a subsequent reverse link transmission if the pre-hopped bandwidth segment is not assignable.

23. An apparatus that facilitates improving bandwidth utilization and supporting time-division duplexed beam-forming at a user device in a wireless communication environment, comprising:
  means for transmitting a signal over a bandwidth segment in a reverse link transmission;
  means for receiving a signal in a subsequent forward link time slot using the same bandwidth segment;
  means for receiving an assignment of a pre-hopped bandwidth segment for utilization in a next reverse link time slot if the pre-hopped bandwidth segment is assignable; and means for receiving at least one of an assignment of a new bandwidth segment and an instruction to provide on-demand pilot information if the pre-hopped bandwidth segment is not assignable.

24. The apparatus of claim 23, further comprising utilizing the new bandwidth segment for a subsequent reverse link transmission if the pre-hopped bandwidth segment is not assignable.

25. A non-transitory computer readable medium having stored thereon computer executable instructions operable to cause the medium to cause the computer to:
   transmit a signal over a bandwidth segment in a reverse link transmission;
   receive a signal in a subsequent forward link time slot using the same bandwidth segment;
   receive an assignment of pre-hopped bandwidth segment for utilization in a next reverse link time slot if the pre-hopped bandwidth segment is assignable; and
   receive at least one of an assignment of a new bandwidth segment and an instruction to provide on-demand pilot information if the pre-hopped bandwidth segment is not assignable.

26. The non-transitory computer-readable medium of claim 25, further comprising instructions causing the computer to: utilize the new bandwidth segment for a subsequent reverse link transmission if the pre-hopped bandwidth segment is not assignable.

27. A method for improving bandwidth utilization and supporting time-division duplex beam-forming at a user device in a wireless communication environment, comprising:
   transmitting a signal over a bandwidth segment in a reverse link transmission;
   receiving a signal in a subsequent forward link time slot using the same bandwidth segment;
   receiving an assignment of a pre-hopped bandwidth segment for utilization in a next reverse link time slot if the pre-hopped bandwidth segment is assignable; and
   receiving at least one of an assignment of a new bandwidth segment and an instruction to provide on-demand pilot information if the pre-hopped bandwidth segment is not assignable.

28. The method of claim 27, further comprising utilizing the new bandwidth segment for a subsequent reverse link transmission if the pre-hopped bandwidth segment is not assignable.

* * * * *